US012666266B2

(12) United States Patent
Sharma Banjade et al.

(10) Patent No.: US 12,666,266 B2
(45) Date of Patent: Jun. 23, 2026

(54) CONNECTED DEVICE REGION IDENTIFICATION

(71) Applicant: Intel Corporation, Santa Clara, CA (US)

(72) Inventors: Vesh Raj Sharma Banjade, Portland, OR (US); Satish Chandra Jha, Portland, OR (US); Kathiravetpillai Sivanesan, Portland, OR (US); Liuyang Lily Yang, Portland, OR (US); Ned M. Smith, Beaverton, OR (US); S M Iftekharul Alam, Hillsboro, OR (US); Arvind Merwaday, Beaverton, OR (US); Francesc Guim Bernat, Barcelona (ES); Kshitij Arun Doshi, Tempe, AZ (US); Kuilin Clark Chen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 186 days.

(21) Appl. No.: 17/484,120

(22) Filed: Sep. 24, 2021

(65) Prior Publication Data

US 2022/0014923 A1     Jan. 13, 2022

(51) Int. Cl.
| | |
|---|---|
| *H04W 4/00* | (2018.01) |
| *G01S 5/02* | (2010.01) |
| *H04W 12/122* | (2021.01) |
| *H04W 16/18* | (2009.01) |
| *H04W 64/00* | (2009.01) |

(52) U.S. Cl.
CPC ....... *H04W 12/122* (2021.01); *G01S 5/02213* (2020.05); *H04W 16/18* (2013.01); *H04W 64/00* (2013.01)

(58) Field of Classification Search
CPC ... H04W 12/122; H04W 16/18; H04W 64/00; H04W 4/029
See application file for complete search history.

(56) References Cited

U.S. PATENT DOCUMENTS

| | | | |
|---|---|---|---|
| 10,701,086 B1 * | 6/2020 | Mushtaq | H04L 47/2483 |
| 2012/0052835 A1 * | 3/2012 | Bull | G01S 5/0278 |
| | | | 455/456.1 |
| 2012/0303556 A1 * | 11/2012 | Lin | G01S 5/02527 |
| | | | 706/12 |

(Continued)

OTHER PUBLICATIONS

"European Application Serial No. 22191425.2, Response filed Sep. 26, 2023 to Office Action mailed Apr. 3, 2023", 18 pgs.

*Primary Examiner* — Omoniyi Obayanju
(74) *Attorney, Agent, or Firm* — Schwegman Lundberg & Woessner, P.A.

(57)          ABSTRACT

Various aspects of methods, systems, and use cases include region identification of a malicious device based on crowd-sourced locations. A method may include generating a grid of bins of a local radio coverage region, receiving location data from a plurality of devices in the local radio coverage region, and classifying locations of the plurality of devices with respect to the bins. The method may include associating the classified locations of the plurality of devices to the received location data for corresponding devices of the plurality of devices, and generating a model, from the associated classified locations and the received location data.

20 Claims, 15 Drawing Sheets

(56) References Cited

U.S. PATENT DOCUMENTS

| | | | |
|---|---|---|---|
| 2014/0031055 A1* | 1/2014 | Do | H04W 16/18 |
| | | | 455/456.1 |
| 2015/0133152 A1* | 5/2015 | Edge | G01S 5/0036 |
| | | | 455/456.1 |
| 2017/0280302 A1* | 9/2017 | Dickow | B60R 25/245 |
| 2019/0036925 A1* | 1/2019 | Isola | H04L 63/10 |

* cited by examiner

CONNECTED DEVICE REGION IDENTIFICATION

BACKGROUND

Edge computing, at a general level, refers to the implementation, coordination, and use of computing and resources at locations closer to the "edge" or collection of "edges" of the network. The purpose of this arrangement is to improve total cost of ownership, reduce application and network latency, reduce network backhaul traffic and associated energy consumption, improve service capabilities, and improve compliance with security or data privacy requirements (especially as compared to conventional cloud computing). Components that can perform edge computing operations ("edge nodes") can reside in whatever location needed by the system architecture or ad hoc service (e.g., in an high performance compute data center or cloud installation; a designated edge node server, an enterprise server, a roadside server, a telecom central office; or a local or peer at-the-edge device being served consuming edge services).

Applications that have been adapted for edge computing include but are not limited to virtualization of traditional network functions (e.g., to operate telecommunications or Internet services) and the introduction of next-generation features and services (e.g., to support 5G network services). Use-cases which are projected to extensively utilize edge computing include connected self-driving cars, surveillance, Internet of Things (IoT) device data analytics, video encoding and analytics, location aware services, device sensing in Smart Cities, among many other network and compute intensive services.

Edge computing may, in some scenarios, offer or host a cloud-like distributed service, to offer orchestration and management for applications and coordinated service instances among many types of storage and compute resources. Edge computing is also expected to be closely integrated with existing use cases and technology developed for IoT and Fog/distributed networking configurations, as endpoint devices, clients, and gateways attempt to access network resources and applications at locations closer to the edge of the network.

A new era of compute is emerging in which intensive compute operations are no longer performed primarily in data centers at the core of a network. Rather, with new data transport technologies, such as 5G and new types of fabrics (e.g., network architectures), compute resources may be placed in locations that are remote from a conventional data center. For example, compute resources may be available both in cell towers, base stations, and central offices. Furthermore, given their remote placement (e.g., remote from the core of a network), many of the compute devices that will perform the compute operations or interact with the edge devices may have unknown security clearance. As such, the security of compute locations may fluctuate over time leading to an inability to guarantee a fixed level of security.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Physical location information of nodes in several emerging 5G/B5G (beyond 5G) verticals such as intelligent transportation system (ITS), industrial IoT/Factory of the future, autonomous mobile robotics, etc. have a large impact on performance and operation of these verticals. Specifically, if a malicious user (e.g., a jammer or attacker) invades the network, identifying location of such a malicious node is beneficial to reduce the adverse impact caused by the malicious user. However, location identification in these networks is often a challenge.

Physical location information of nodes within a network, if compromised, may cause such networks (e.g. Internet of Things (IoT), Internet of Vehicles, etc.) vulnerable to jamming, misbehavior, and other attacks which may further lead to potential fault, failures, or outages in the network operation. As an example, any new incoming or existing user equipment (UE) within a 5G/B5G network may initiate a jamming attack. When a suspicious spike in network resource utilization associated with a specific sub-band servicing a specific geo is detected at the network infrastructure, for example, the infrastructure may identify the presence of a potentially malicious user (e.g., a jammer).

Because the malicious user may be any UE inside or outside the network, such malicious user may easily manipulate their reported location information, for example by tampering with software or spoofing the Global navigation satellite system (GNSS) signal outside the UE device. Identification of such malicious users with an increased robustness via location-based physically unclonable function (PUF) either standalone, or on top of existing (if any) mechanisms is highly beneficial to locate the malicious user.

The systems and techniques described herein use crowd-sourcing to construct or establish location-based fingerprinting (LBF) of an area at the edge infrastructure based on exploitation of wireless channel properties, which then may be used to establish unique fingerprinting regions (FPRs). After such ground truth regions are established, they may be used to test the received signal from any potentially malicious user (e.g., a jammer or misbehaving user) and map it to particular fingerprinting region. This mapping may be used in identifying or verifying the Potential Malicious User (PMU) region.

Figure 1:
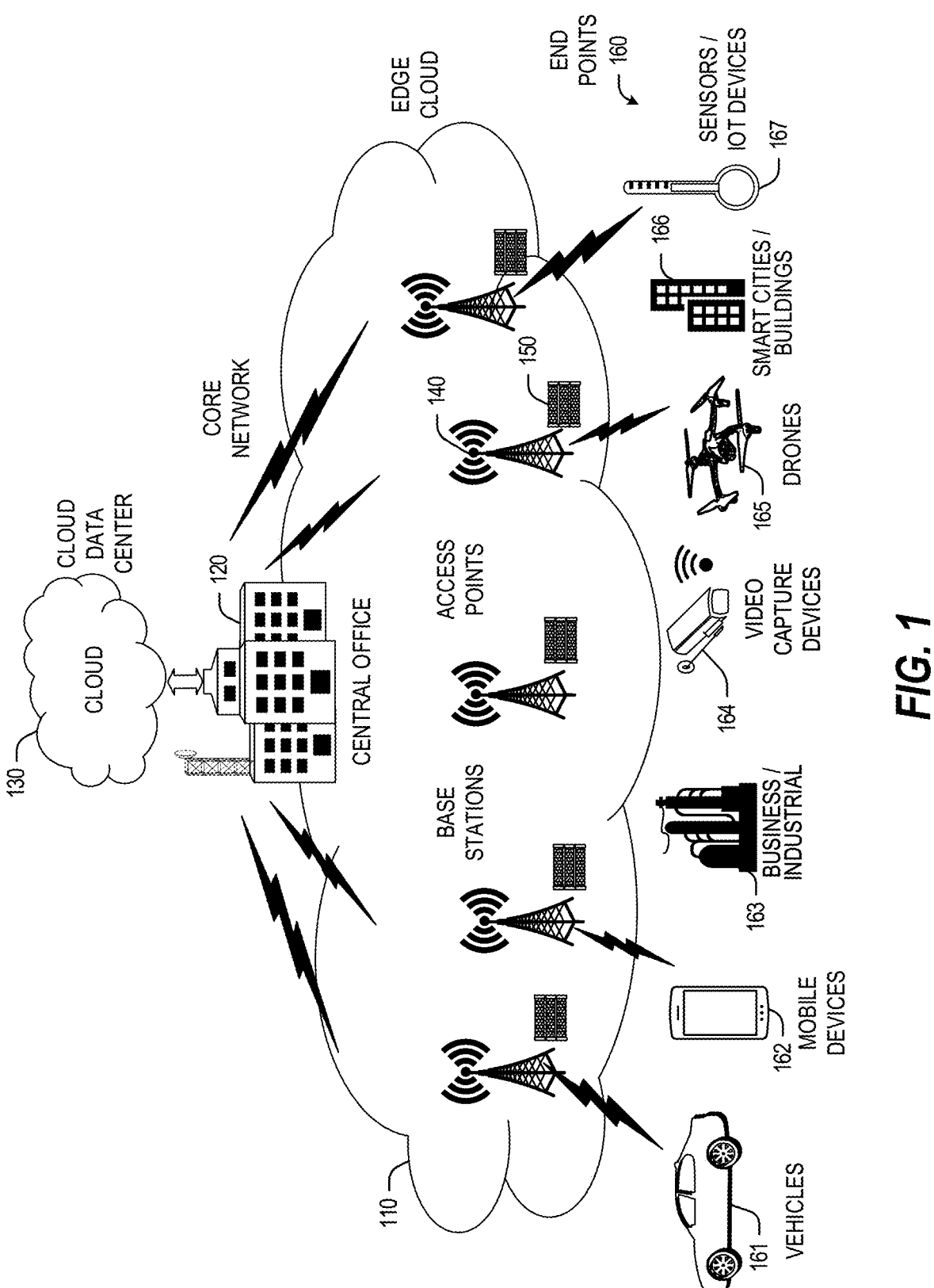
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
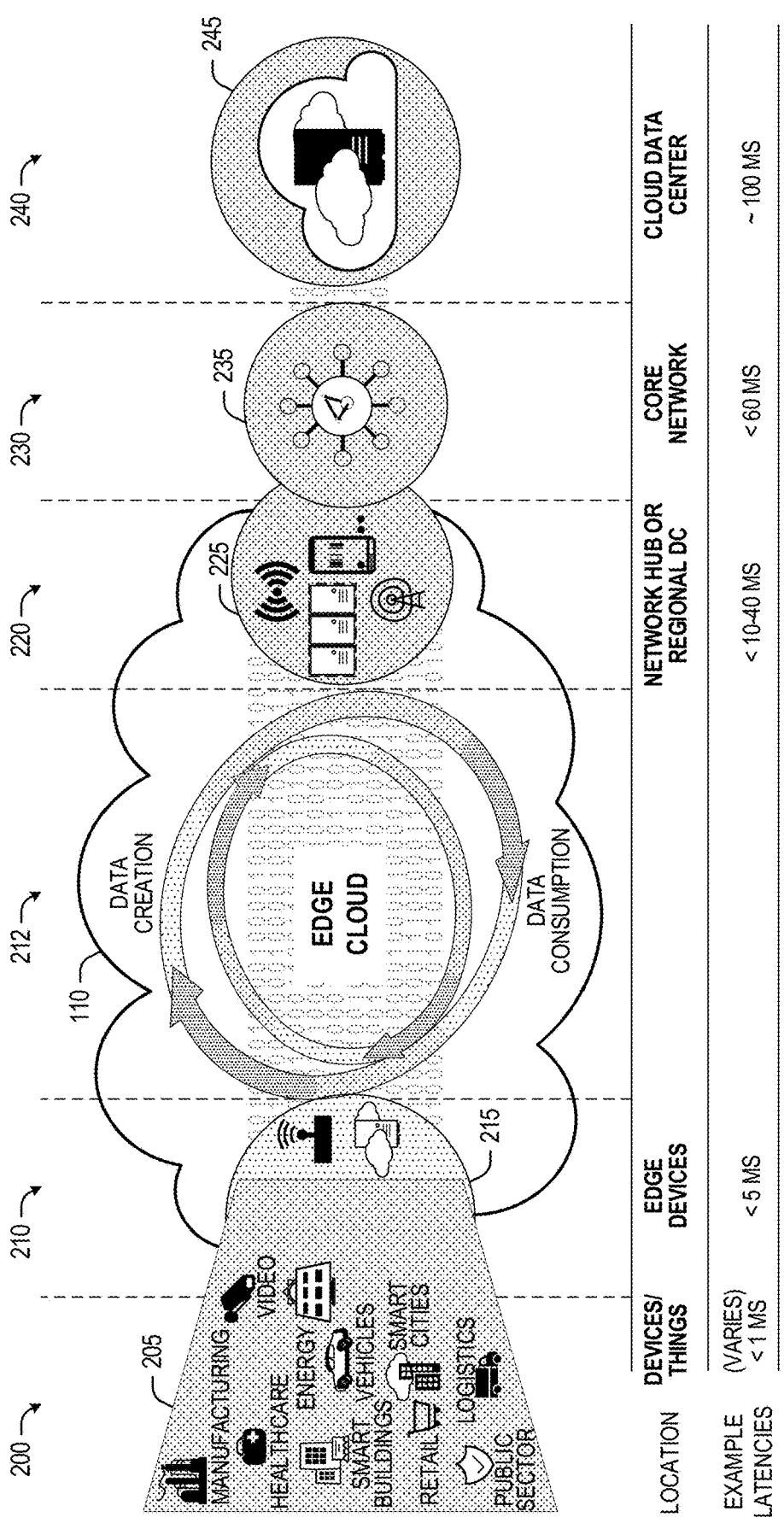
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge compute nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may be an appliance computing device that is a self-contained processing system including a housing, case or shell. In some cases, edge devices are devices presented in the network for a specific purpose (e.g., a traffic light), but that have processing or other capacities that may be harnessed for other purposes. Such edge devices may be independent from other networked devices and provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 7B. The edge cloud 110 may also include one or more servers and/or one or more multi-tenant servers. Such a server may implement a virtual computing environment such as a hypervisor for deploying virtual machines, an operating system that implements containers, etc. Such virtual computing environments provide an execution environment in which one or more applications may execute while being isolated from one or more other applications.

Figure 3:
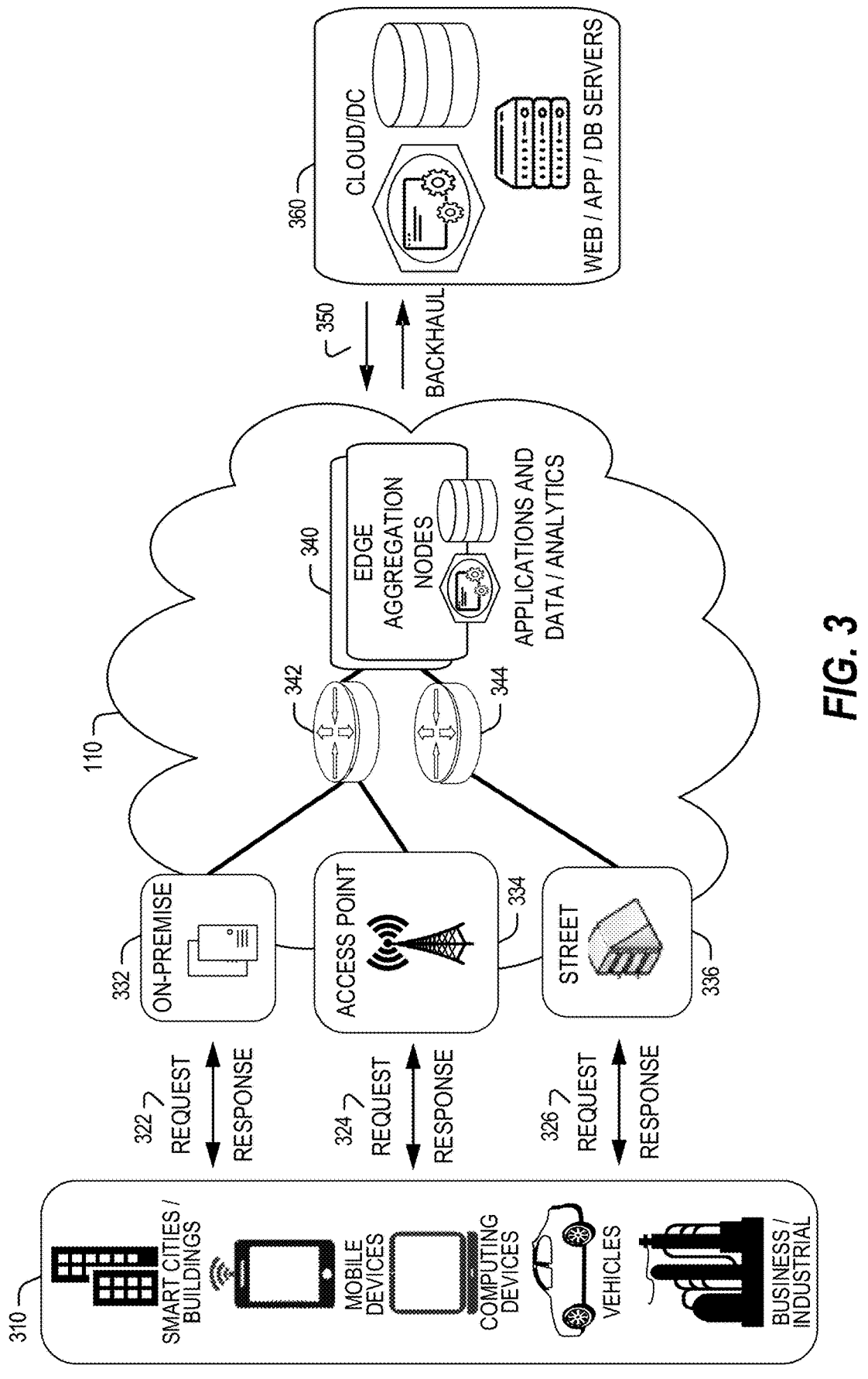
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

Figure 4:
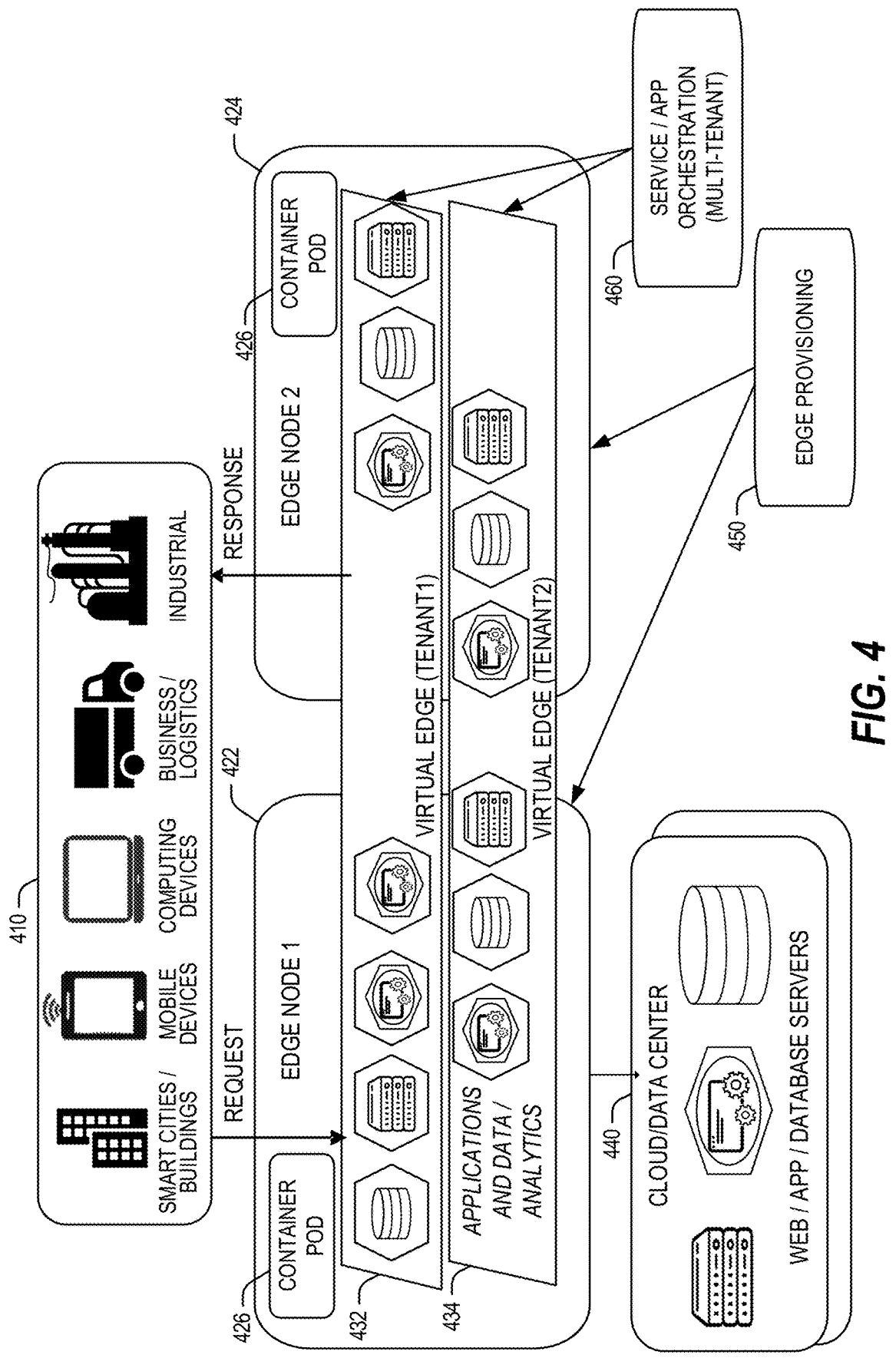
FIG. 4 illustrates deployment of a virtual edge configuration in an edge computing system operated among multiple edge nodes and multiple tenants.

FIG. 4 illustrates deployment and orchestration for virtual edge configurations across an edge computing system operated among multiple edge nodes and multiple tenants. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc.

However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes consisting of containers, FaaS engines, Servlets, servers, or other computation abstraction may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys.

When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
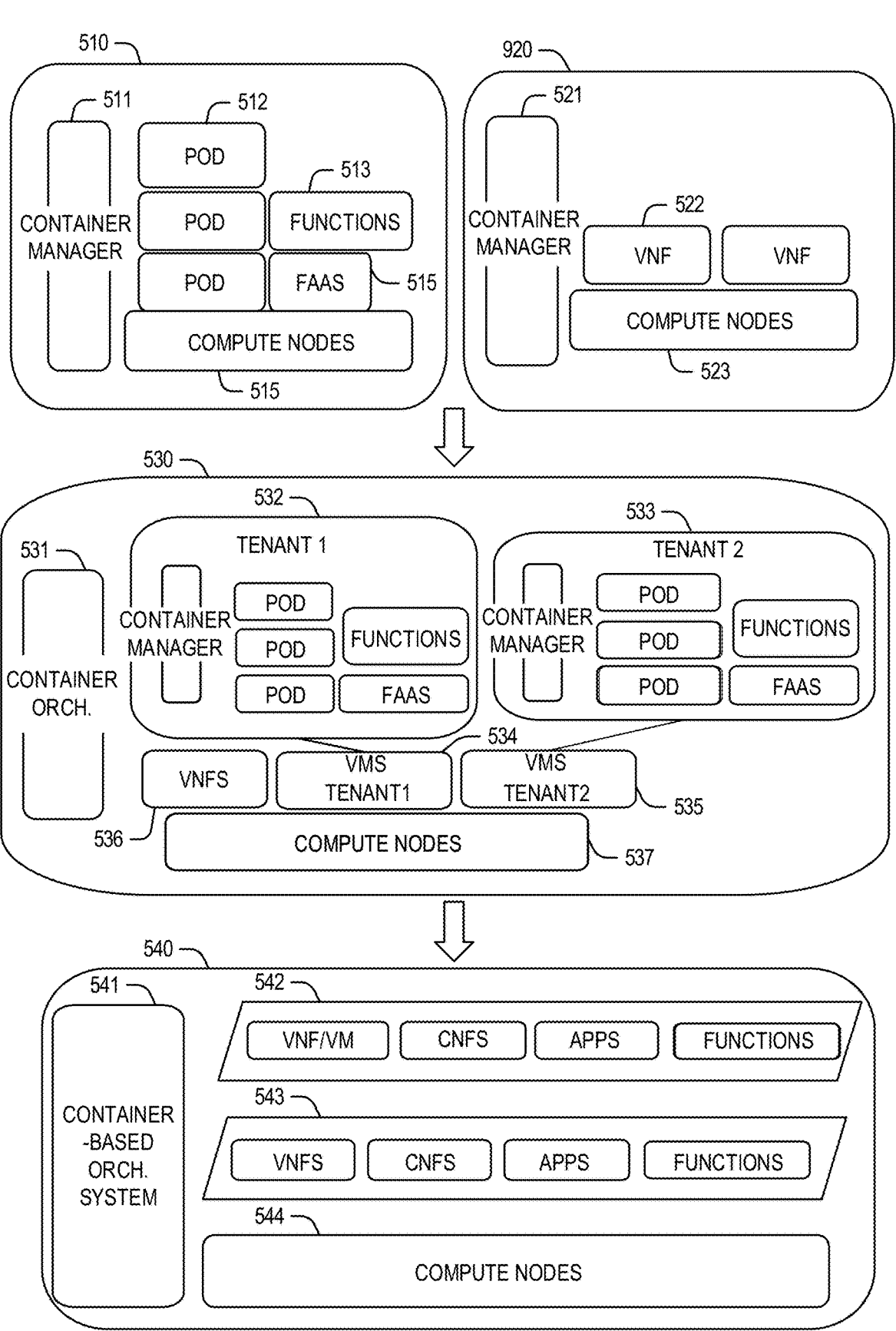
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via compute nodes (515 in arrangement 510), or to separately execute containerized virtualized network functions through execution via compute nodes (523 in arrangement 520). This arrangement is adapted for use of multiple tenants in system arrangement 530 (using compute nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on compute nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

Figure 6:
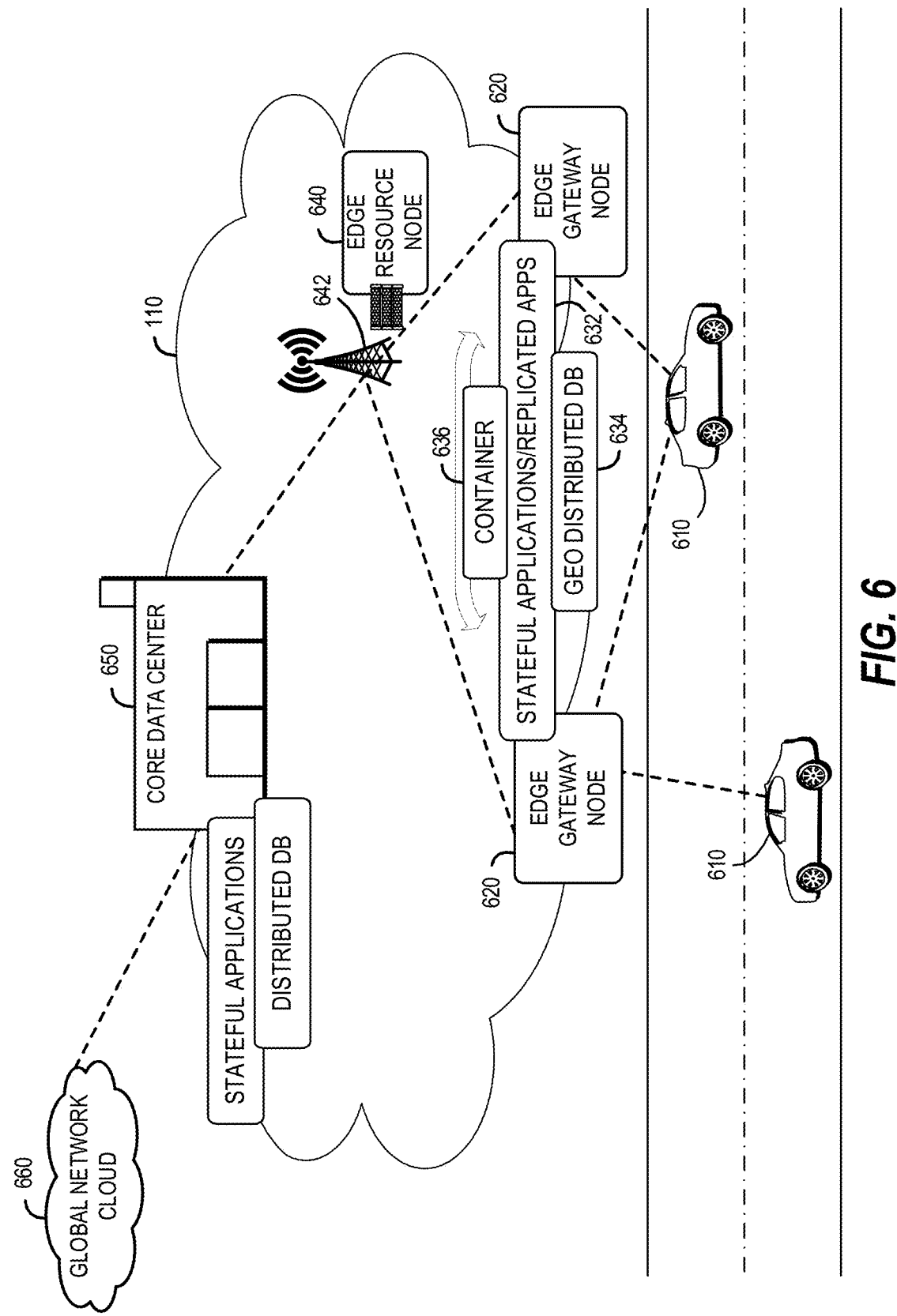
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client compute nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 610 and a particular edge gateway device 620 may propagate so as to maintain a consistent connection and context for the client compute node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client compute nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a based station of a cellular network). As discussed above, the respective edge resource nodes 640 include an amount of processing and storage capabilities and, as such, some processing and/or storage of data for the client compute nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client compute node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 782 of FIG. 7B, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 782 of FIG. 7B. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 782 of FIG. 7B, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third party payment entity. The servers enable purchasers and/or licensors to download the computer readable instructions 782 from the edge provisioning node 644. For example, the software instructions, which may correspond to the example computer readable instructions 782 of FIG. 7B, may be downloaded to the example processor platform/s, which is to execute the computer readable instructions 782 to implement the methods described herein.

In some examples, the processor platform(s) that execute the computer readable instructions 782 can be physically located in different geographic locations, legal jurisdictions, etc. In some examples, one or more servers of the edge provisioning node 644 periodically offer, transmit, and/or force updates to the software instructions (e.g., the example computer readable instructions 782 of FIG. 7B) to ensure improvements, patches, updates, etc. are distributed and applied to the software instructions implemented at the end user devices. In some examples, different components of the computer readable instructions 782 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

In further examples, any of the compute nodes or devices discussed with reference to the present edge computing systems and environment may be fulfilled based on the components depicted in FIGS. 7A and 7B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 7A:
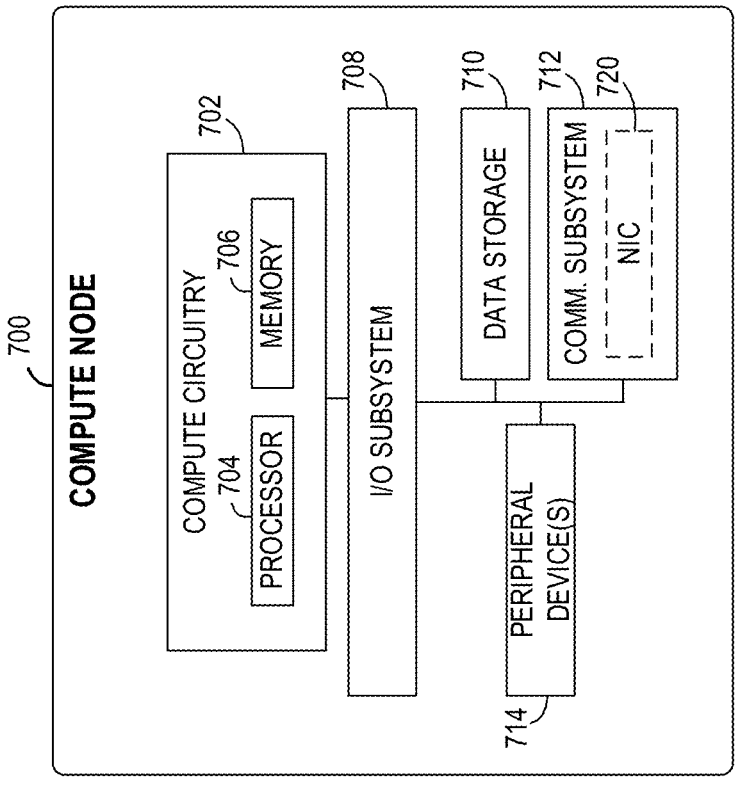
FIG. 7A provides an overview of example components for compute deployed at a compute node in an edge computing system.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein.

Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway of an implementing edge computing system). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

Figure 7B:
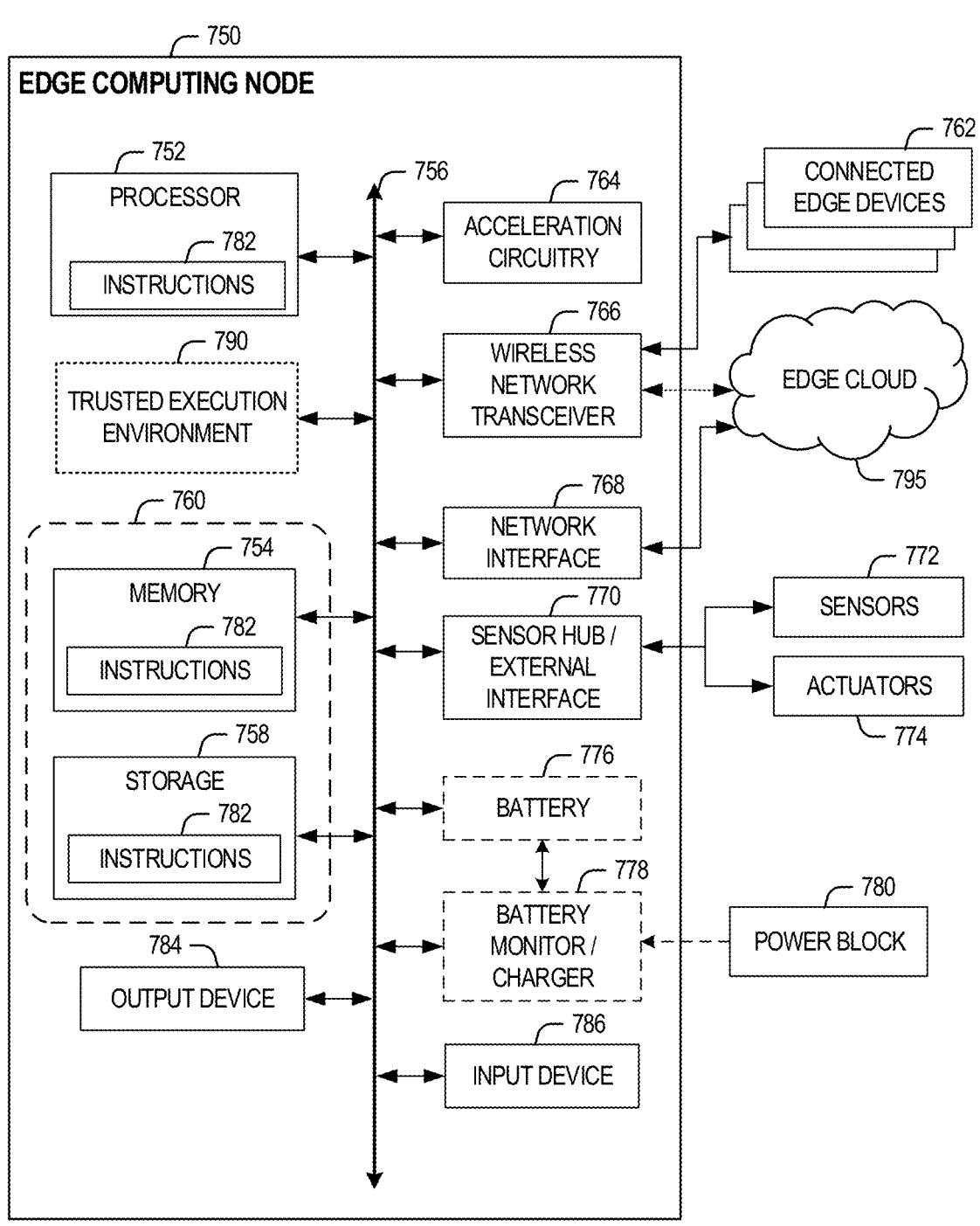
FIG. 7B provides a further overview of example components within a computing device in an edge computing system.

In a more detailed example, FIG. 7B illustrates a block diagram of an example of components that may be present in an edge computing node 750 for implementing the techniques (e.g., operations, processes, methods, and methodologies) described herein. This edge computing node 750 provides a closer view of the respective components of node 700 when implemented as or as part of a computing device (e.g., as a mobile device, a base station, server, gateway, etc.). The edge computing node 750 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 750, or as components otherwise incorporated within a chassis of a larger system.

The edge computing device 750 may include processing circuitry in the form of a processor 752, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, California. As an example, the processor 752 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 752 and accompanying circuitry may be provided in a single socket form factor, multiple socket form factor, or a variety of other formats, including in limited hardware configurations or configurations that include fewer than all elements shown in FIG. 7B.

The processor 752 may communicate with a system memory 754 over an interconnect 756 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on Bluetooth Low Energy (BLE), or another low power radio, to save power. More distant connected edge devices 762, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 766 (e.g., a radio transceiver) may be included to communicate with devices or services in the edge cloud 795 via local or wide area network protocols. The wireless network transceiver 766 may be a low-power wide-area (LPWA) transceiver that follows the IEEE 802.15.4, or IEEE 802.15.4 g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as timeslotted channel hopping, described in the IEEE 802.15.4 e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 795 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, global navigation system (e.g., GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 750. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 776 may power the edge computing node 750, although, in examples in which the edge computing node 750 is mounted in a fixed location, it may have a power supply coupled to an electrical grid, or the battery may be used as a backup or for temporary capabilities. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776, if included. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, California, among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 782 on the processor 752 (separately, or in combination with the instructions 782 of the machine readable medium 760) may configure execution or operation of a trusted execution environment (TEE) 790. In an example, the TEE 790 operates as a protected area accessible to the processor 752 for secure execution of instructions and secure access to data. Various implementations of the TEE 790, and an accompanying secure area in the processor 752 or the memory 754 may be provided, for instance, through use of Intel® Software Guard Extensions (SGX) or ARM® Trust-Zone® hardware security extensions, Intel® Management Engine (ME), or Intel® Converged Security Manageability Engine (CSME). Other aspects of security hardening, hardware roots-of-trust, and trusted or protected operations may be implemented in the device 750 through the TEE 790 and the processor 752.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 8:
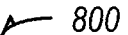
FIG. 8 illustrates a domain topology for respective internet-of-things (IoT) networks coupled through links to respective gateways, according to an example.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 9:
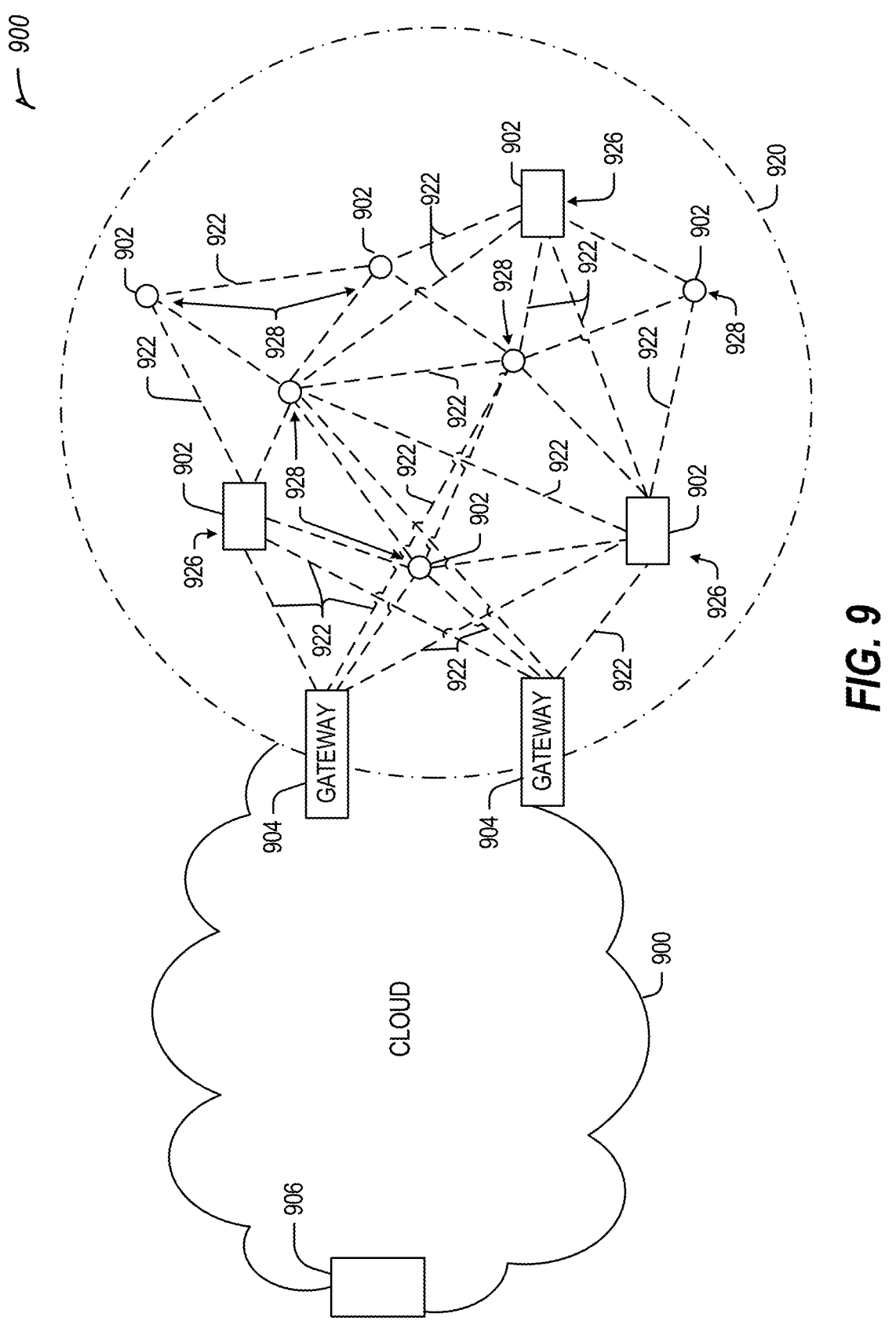
FIG. 9 illustrates a cloud computing network in communication with a mesh network of IoT devices operating as a fog device at the Edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8 and 9, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or integrated into "Edge" computing systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies. This is discussed further with respect to the communication environment and hardware of an IoT processing device depicted in FIG. 10.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 9 below.

FIG. 9 illustrates a cloud computing network in communication with a mesh network of IoT devices (devices 902) operating as a fog platform in a networked scenario. The mesh network of IoT devices may be termed a fog network 920, established from a network of devices operating at the Edge of the cloud 900. To simplify the diagram, not every IoT device 902 is labeled.

The fog network 920 may be considered to be a massively interconnected network wherein a number of IoT devices 902 are in communications with each other, for example, by radio links 922. The fog network 920 may establish a horizontal, physical, or virtual resource platform that can be considered to reside between IoT Edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the Edge and the cloud. Thus, references in the present document to the "Edge", "fog", and "cloud" are not necessarily discrete or exclusive of one another.

As an example, the fog network 920 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be Edge devices that provide communications between the cloud 900 and the fog network 920, and may also provide the backend process function for data obtained from sensors 928, such as motion data, flow data, temperature data, and the like. The data aggregators 926 may collect data from any number of the sensors 928, and perform the back-end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog network 920 provided from these IoT devices 902 may be presented to devices in the cloud 900, such as a server 906, as a single device located at the Edge of the cloud 900, e.g., a fog network operating as a device or platform. In this example, the alerts coming from the fog platform may be sent without being identified as coming from a specific IoT device 902 within the fog network 920. In this fashion, the fog network 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog platform may be configured in a declarative programming style, enabling the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog network 920 device the IoT devices 902, such as particular sensors 928, needed to answer the query. The data from these sensors 928 may then be aggregated and analyzed by any combination of the sensors 928, data aggregators 926, or gateways 904, before being sent on by the fog network 920 to the server 906 to answer the query. In this example, IoT devices 902 in the fog network 920 may select the sensors 928 used based on the query, such as adding data from flow sensors or temperature sensors. Further, if some of the IoT devices 902 are not operational, other IoT devices 902 in the fog network 920 may provide analogous data, if available.

In other examples, the operations and functionality described herein may be embodied by an IoT or Edge compute device in the example form of an electronic processing system, within which a set or sequence of instructions may be executed to cause the electronic processing system to perform any one of the methodologies discussed herein, according to an example embodiment. The device may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 10:
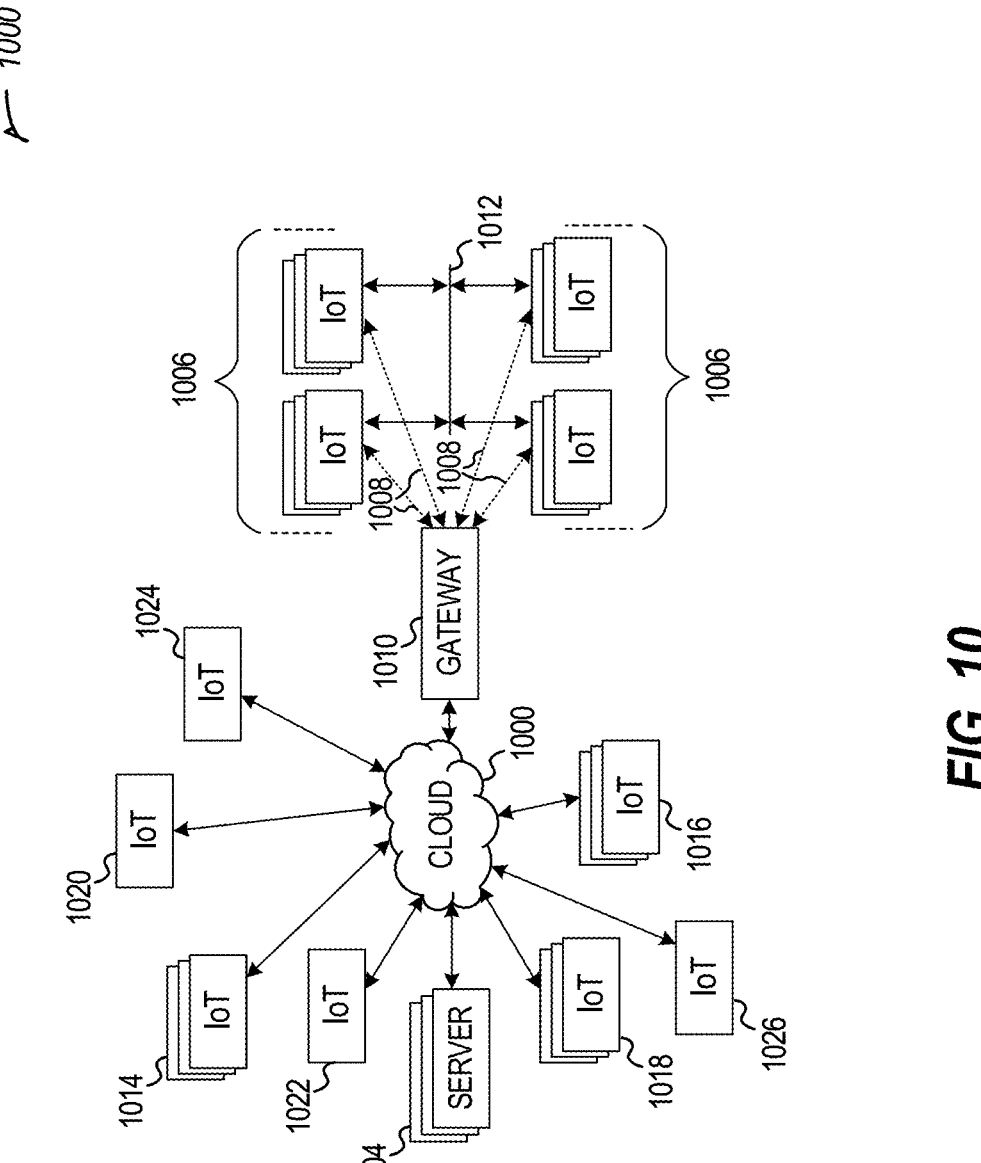
FIG. 10 illustrates a drawing of a cloud computing network, or cloud, in communication with a number of Internet of Things (IoT) devices, according to an example.

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local Edge cloud or fog implementation among a local area network. Further, the gateway 1028 that is depicted may operate in a cloud-to-gateway-to-many Edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As may be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 9).

As discussed above, the systems and methods described herein provide region identification of a malicious device based on crowdsourced locations. To locate the region of operation (within a specific geo-area) of malicious users (e.g., jammers, misbehaving nodes, attackers, etc.), the systems and methods described herein create a radio geometric map of edge infrastructure (e.g., BS/micro-BS/RSU) served cell area where a possible jamming node may be present. In an example, for such an area to be mapped out, the systems and methods described herein use UE crowdsourcing, such as processing of received wireless signals I/Q samples received from transmitting nodes in the vicinity of the edge infrastructure. The samples may be used for location-based fingerprinting to map out the ground-truth radio-location geometry. For example, an edge infrastructure (e.g., an edge device) collects wireless/RF signals (e.g., from neighboring UEs in its service vicinity), and measures reports from the crowdsourced UEs passively, continuously or on-demand. The edge infrastructure may classify the received signals in terms of their bins, where a bin is a small region surrounding a precise location (e.g., within a grid) and may train a Location-Verification Neural Networks (LVNNs) with bin location identifiers (e.g., a Bin ID) to establish the ground-truth radio-location map/geometry. When a malicious user is active, its jamming signal is at the location RX. When fed to the trained NN, the RX may then be used to infer its bin ID. From the bin ID, the location-bin of the malicious user may be deduced (e.g., based on trained NN model established from prior or periodically evolved training).

In an example, the edge infrastructure may collect ambient or other contextual sensor information, which may have impacted the properties of the received signal. Over time, the infrastructure may identify which of those sensors are affecting how some of the received signals are perceived. Those sensors may be included as part of the NN to better capture contextual attributes associated with a bin location. In some examples, false-positives, such as misbehaviors that may be related to ambient noise, may be subtracted out given baseline ambient signals.

The location verification techniques described herein may be used for resilient networking in private industrial IoT and massive IoT networks. For example, in smart city and intelligent transportation use cases, these techniques may be deployed (for example with a crypto based traditional authentication mechanism) to create a multi-factor authentication framework for edge or IoT devices integral to edge infrastructure. The location verification (via training and inference) of RAN transmitters may be used as an additional workload or service offering for an edge compute platform.

As discussed in further detail below, the systems and methods described herein may be used to locate a malicious user based on crowdsourcing to construct or establish Location-Based Fingerprinting (LBF) of an area at the edge infrastructure. The LBF may be based on exploitation of wireless channel properties, which may serve to establish fundamentally unique fingerprinting regions (FPRs). Once ground truth FPRs are established, they may be used to test the received signal from potentially malicious sources (e.g., jammer or misbehaving user). The received signal may be mapped to a particular FPR, which may be used to identify or verify Potential Malicious User (PMU) locations (in-bin vs. out-of-bin).

Figure 11:
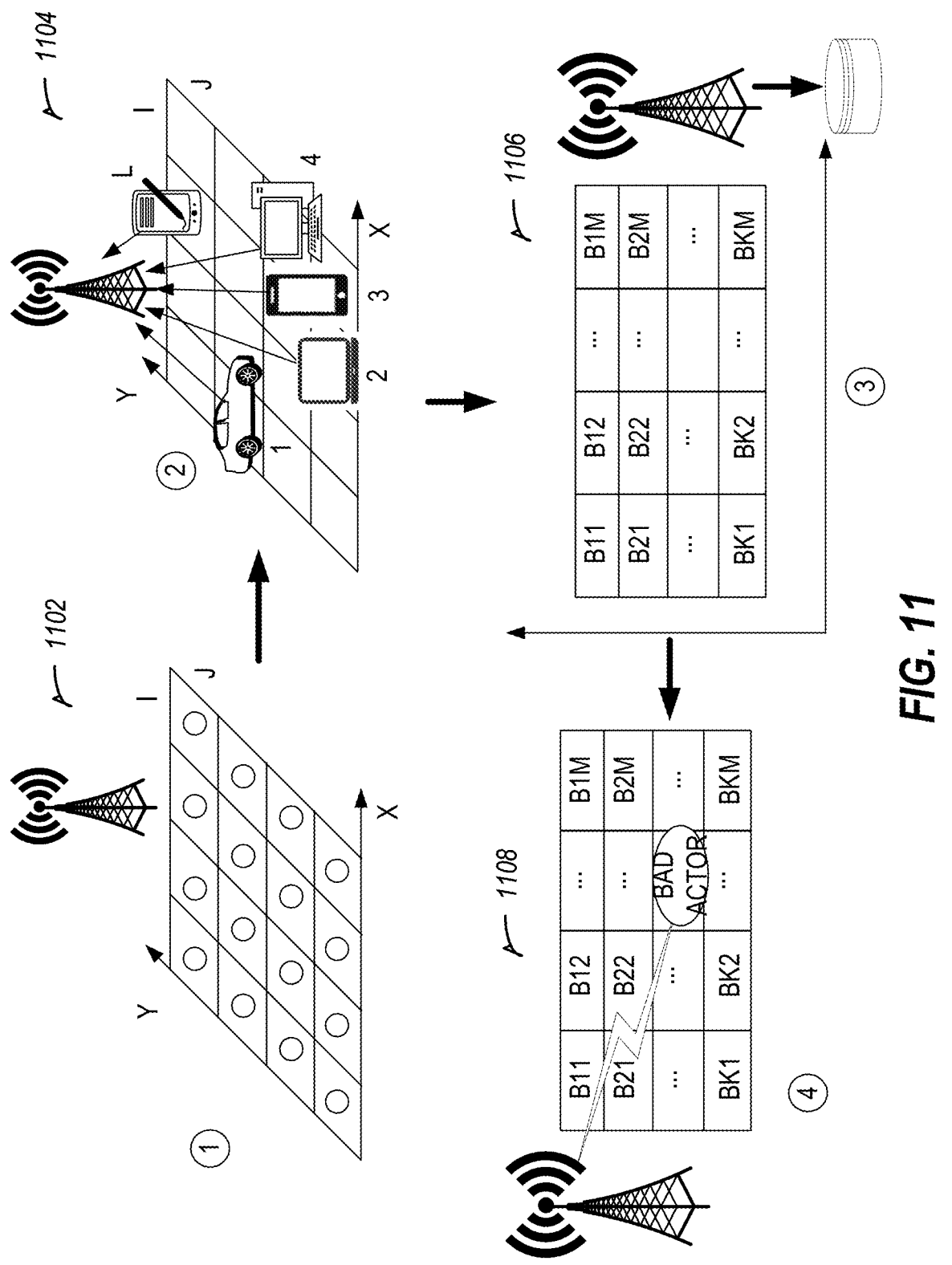
FIG. 11 illustrates a flow diagram showing edge infrastructure for malicious user location verification according to an example.

FIG. 11 illustrates a flow diagram showing edge infrastructure for malicious user location verification according to an example. Examples of edge infrastructure may include cellular base station (BS), micro BS, roadside units (RSUs) deployed at, for example, smart intersections within a smart city, and the likes thereof.

FIG. 11 illustrates four representations 1102-1108 at various snapshots in time during implementation of techniques described herein. Representation 1102 corresponds to bin-map establishment at an infrastructure, representation 1104 corresponds to collection of crowdsource data, representation 1106 corresponds to a hypothesis testing framework for ground truth establishment of reference bins, and representation 1108 corresponds to deployment or inference with a he potential malicious transmission signal. These representations and operations taken at and between each representation are described below.

In representation 1102, an area of coverage (e.g., network coverage for cellular or micro BS, sensors field of view coverage for roadside unit, etc.) is divided into a set of bins. As illustrated in representation 1102, the local coverage area is divided into a logical X-Y (2D) grid with configurable length i and width j, including an area of a=i·j. The total number of M grids along the X-axis and K grids along the Y-axis may be configured, for example based on user input, resource availability, area size, or the like. A configurable logically partitioned coverage area of A=Mi×Kj square meters area covered by the infrastructure is constructed. An example value of (i,j)=(1 m, 1 m), for a one square meter bin size. In an example, each k-th bin is assigned a unique bin-ID k where $k \in \{1, 2, \ldots, MK\}$. Although radio coverage areas are in 3D, the 3D area may be mapped to a 2D region because location as a fingerprinting region (FPR) is expressed in 2D coordinates. Jammers may gain advantage by broadcasting a stronger signal (possibly by positioning itself in z-space) but jammers may be detected based on a behavioral NN fingerprint.

After bins are established in a grid in representation 1102, collection of crowdsource data may occur at representation 1104. After the logical bin-map is established data from already authenticated or known (and optionally trusted) devices is obtained. For example, a total of L sourced UEs within the coverage area of the infrastructure device may send data used for location.

The data may be collected in a passive or active mode. In the passive mode, the crowdsourced UEs may periodically report their data. The data may be obtained over a long time frame. In an example, the data may be collected when resources are available (e.g., when there is excess or available power, bandwidth, etc.).

In the active mode, a crowdsource UE or a group of UEs may be selected by the infrastructure, such as depending on location, position, signal strength, interference levels, etc. The active mode may be triggered on-demand, such as by user input or as needed (e.g., when suspicious network activity occurs, when report of a malicious device occurs, when a suspected malicious device is identified, or the like). The UE or group of UEs may be specifically probed to provide additional data (according to need, such as for bins that do not have data yet) to help collect any additional data.

The wirelessly received signal (I/Q) at the infrastructure from each l-th crowdsource, $l \in \{1, 2, \ldots, L\}$ after passing through wireless channel $C_l$, including multipath fading, pathloss, and shadowing and corrupted by noise $N_l$ may be represented as Equation 1, below:

$$Y_l = C_l S_l + N_l \qquad \text{Eq. 1}$$

where $S_l$ is the TX signal of crowdsource 1. The $C_l$ is uniquely dependent on the location of the transmitter (TX) and crowdsource from the receiver (RX) wherein the path-loss is inverse-exponentially proportional to the distance d between TX and RX.

In both cases, the data to be collected from the UEs to the edge infrastructure, may include reported X, Y coordinate location of the UE, parameters such as Timestamp, received signal strength indicator (RSSI), a Reference Signal Received Power (RSRP), a Reference Signal Received Quality (RSRQ), a Power Headroom Report (PHR), an interference level of a respective device, etc., which may be obtained as a part of the Minimum Drive Test (MDT) (e.g., when the infrastructure is cellular BS or the like), etc. These parameters may include post-processing results of received raw I/Q signal samples of $Y_l$. The infrastructure may use its access to raw signal samples in some examples, and may process the raw signals directly or rely on UE processing.

In representation 1106, the hypothesis testing framework may be used for ground truth establishment of reference bins. For a total of KM number of bins each of area a=i·j square meters, the classification problem can be cast as a KM-ary hypothesis testing problem where based on the received signal, the infrastructure needs to make a classification decision on which bin can the received signal from the crowdsource be classified to. Then, the KM-ary hypothesis-based classification can thus be expressed as Equation 2 below:

$$
\begin{aligned}
&H_0\text{: the } TX \text{ is within bin } b_{11} \qquad \text{Eq. 2}\\
&H_1\text{: the } TX \text{ is within bin } b_{12}\\
&\qquad \ldots\\
&H_{xy}\text{: the } TX \text{ is within bin } b_{xy}\\
&\qquad \ldots\\
&H_{(K-1)(M-1)}\text{: the } TX \text{ is within bin } b_{KM}
\end{aligned}
$$

Representation 1106 may include reducing the M-ary hypothesis testing framework to a binary hypothesis test. Equation 2 may be used to test whether a signal is in each bin, it may be simplified by performing binary classifications for each bin. Equation 2 has classification complexity and order that may increase multiplicatively with K and M and thus any ML or non-ML based classifiers, (e.g., Deep Neural Network (DNN) or K-nearest neighbor (KNN) based classifier) may incur large computational cost for exhaustive search based classification (for KNN) or for training and deployment of large-size and order DNN. In some examples, such computationally complex KNN/DNN are justifiable via high computational capability at the infrastructure. In other examples, a lower complexity testing method may be used to reduce the M-ary hypothesis testing framework into a generalized binary hypothesis testing framework of the form of Equation 3 below:

$$H_0: \text{the } TX \text{ is not in } b_{xy}, \qquad \text{Eq. 3}$$

$$H_1: \text{the } TX \text{ is in } b_{xy},$$

The binary test may be run for each of the KM bins since $x \in \{1, 2, \ldots, K\}$, $y \in \{1, 2, \ldots, M\}$. In this way, the search space for KNN or size of any DNN may be greatly reduced since the reduction of the classifier's need to classify between KM hypotheses—$H_0$ vs. $H_1$ vs .... $H_{xy}$ ... vs. $H_{KM}$ to just two hypotheses—$H_0$ vs. $H_1$.

Representation 1106 may include association of crowd-source received signal to bin ID. Using Equation 1 and Equation 2 or Equation 3, the channel from an l-th crowd-source to the infrastructure, $H_l$ may be uniquely associated to bin $b_{xy}$ given the crowdsource is transmitting from within bin $b_{xy}$ (that is, under true hypothesis $H_0$). The unique association may be attributed to channel features (properties) such as RSSI/RSRQ/RSRP or multipath channel gains associated with the unique bins. For RSSI/RSRQ/RSRP, the quality or strength of the received crowdsource signal at the infrastructure is inversely proportional to the distance between the crowdsource and the infrastructure. For the multipath channel gains associated with the unique bins, the IQ samples within a given bin may be used to finely train a Neural Network (NN) so that the NN associates or uniquely maps the corresponding channel gain vectors to the bin-ID. Such uniqueness of the channel-to-bin association attribute relies on the principle that channel gains at different locations serve as unique link signature due to unique multipath characteristics which produce unique IQ samples (vectors: both magnitude and phase).

In a stochastic approach (non-ML), Equation 1 and Equation 3 may be used in the training phase, for any crowd-source (UE) transmitter/E $\{1, 2, \ldots, L\}$, as $C_l$ is the channel from itself to the infrastructure. The l-th received signal $Y_l$, which is a function of $C_l$ may be associated (e.g., from Equation 1) to the label $t^{(l)}=1$ for crowdsource transmitting from within $b_{xy}$ and $t^{(l)}=0$ otherwise. Hence, the task at hand is to build a function $f$ $(C_l)$ by using the channel training vectors and bin-IDs such that, as stated in Equation 4:

$$t = f(Y_l) \in \{0, 1\} \qquad \text{Eq. 4}$$

which maps any $Y_l$ into decision on the UEs location being in-bin or out-of-bin. Two metrics may be defined, including the probability of false alarm $(P_f)$ and the probability of missed detection $(P_{md})$, to capture the error performance of the classification mechanism which are defined as in Equation 5 below:

$$P_f = Pr\{t = 1 | H_0\} \qquad \text{Eq. 5}$$

$$P_{md} = Pr\{t = 0 | H_1\}$$

When the channel statistics of $Y_l$ are known or unknown under the two hypotheses, an example powerful test for the hypothesis testing problem at hand is determined by the Neyman-Pearson (NP) criteria where the log likelihood ratio (LLR) or generalized likelihood ratio (GLRT) in case the channel statistics are unknown and need to be estimated, respectively, of the probability density function (PDF) of $Y_l$ under the two hypotheses yields the optimal LLR test (LLRT) or generalized likelihood ratio test (GLRT) (in case of unknown channel statistics) such that, as stated in Equation 6:

$$T(C_l) = \log\left(\frac{p_{Y_l}(Y_l | H_1)}{p_{Y_l}(Y_l | H_0)}\right) \qquad \text{Eq. 6}$$

which then reduces under the NP criteria to, as expressed in Equation 7:

$$t = f(C_l) = \begin{cases} 1, & T(Y_l) \geq \theta, \\ 0, & T(Y_l) < \theta, \end{cases} \qquad \text{Eq. 7}$$

where $\theta$ is the detection threshold which can be chosen based on various criteria to minimize the error metrics.

One criterion to set the threshold is based on constant false alarm rate (CFAR) where $\theta$ is first chosen to ensure that a desired $P_f$ is obtained. Other criteria can be based on minimization of the overall probability of error $(P_e)$ in detection where $P_e$ is defined as in Equation 8 below:

$$P_e = P(H_0) \cdot P_f + P(H_1) \cdot P_{md} \qquad \text{Eq. 8}$$

In an example, a statistical approximation for distribution of $Y_l$ (necessary for GLRT construction) may be used. In this example, realizing Equation 6 includes either an exact PDF of $Y_l$ under $H_1$ and $H_0$, for constructing an LRT which is likely not possible in practice or an estimation of PDF of $Y_l$, which is a more practical technique. Thus, construction of GLRT with estimated PDF of $Y_l$, which is denoted by $\hat{P}_{Y_l}(X | H_i)$ for $i \in \{0, 1\}$ may be expressed as in Equation 9 below:

$$T(Y_l) = \log\left(\frac{p_{Y_l}(Y_l | H_1)}{p_{C_l}(Y_l | H_0)}\right) \sim \log\left(\frac{\hat{p}_{C_l}(Y_l | H_1)}{\hat{p}_{C_l}(Y_l | H_0)}\right) \qquad \text{Eq. 9}$$

A joint PDF for $Y_l$, which is affected by comprises of pathloss, fading, or shadowing together may be derived or estimated using any of the three options described below to achieve $\hat{P}_{Y_l}(Y_l | H_i)$. In an example, this may be achieved based on MDT measurements acquisition over a long periodic of time followed by empirical PDF fitting. In another example, this may be achieved using an approximate distribution (e.g., a Mixture Gamma technique) and then using moments matching to generate a relation on the hyper-parameters of the distribution. That is, the hyperparameters may be a function of the moments. This approach, however, requires up to k-th order moments matching where $k \geq 1$ primarily depends on the number of hyperparameters of the approximate PDF in question. For example, in case of Mixture Gamma Model, larger value of k means more accurate approximation. Then, such higher order moment matching equations may be solved for the unknown parameters either numerically (more practical) or analytically (more theoretical). Eventually, the outcome of this option is the approximate PDF which takes in the position coordinates, path loss exponents, shadowing standard deviation and the fading index parameters and gives out the PDF. Such parameters may have a range of values per bin, and all of these may be fixed once training (e.g., based on pilot signals in RX) with 'n' number of received signals from each bin is carried out. However, this technique may be a tedious approach compared to the above approach.

In yet another example, an estimation of the channel I/Q samples may be used to equalize the received signal. This approach may reduce the problem into an additive noise only based signal impairment with a scaled signal (e.g., when looking at Equation 1). Then, a simple Gaussian approximation may be used for the received signal modeling under $H_0$ and $H_1$ given that the mean and variance of the noise and signal may be estimated within a bin. This estimation is a practical assumption (e.g., may be obtained via prior MDT-based measurements based on received signal PSD comprising of noise and signal under $H_1$ and noise only under $H_0$).

In addition to or in replacement of the stochastic approach, a NN-based approach (ML-based) may be used. The framework presented above in the non-ML based approach is suitable for scenarios when the channel statistics is known or can be estimated with the desired level of confidence. In other words, those are valid when LRT or GLRT may be constructed by knowing or estimating the channel statistics (e.g., PDFs). However, this may be complex and time consuming to implement because the ground truth channel measurements have to be collected for a long time (based on pilots/pre-ambles in the receive signal) and a retrofitting/empirical distribution of the channel statistics need to be derived based on measurements for the LRT or GLRT to be usable. MDT in cellular may be used to realize this approach. In an example, training or associating the bin locations with the channel statistics may include using NN classifiers. An NN-based trained with $Y_l$ may be used to classify the obtained $Y_l$ into one of the bins. In this case the function $f(Y_l)$ is the function implemented by the NN. In the verification/inference phase, the trained NN is used on the test $t=f(C_l)$ to provide the decision on $t\in\{0,1\}$. For completeness, a short description of this method is included below.

A feedforward NN may be used for this purpose where the input of the NN is $y^{(0)}=Y_l$, and layer $(p-1)$ has $Q^{(P-1)}$ outputs by processing the inputs with $Q^{(p-1)}$ neurons where output of the r-th neuron of the p-th layer can be expressed as in Equation 10 below:

$$y_r^{(p)} = \sigma\left(w_r^{(p-1)}y^{(p-1)} + b_r^p\right) \qquad \text{Eq. 10}$$

with $$w_r^{(p-1)}$$

and $$b_r^p$$

being the weight and bias coefficients obtained via training and $\sigma(\cdot)$ is the sigmoid activation function. The final output of the NN is then expressed as in in Equation 11 below:

$$\tilde{t}(Y_l) \stackrel{\Delta}{=} \sigma\left(y^{(P)}\right) \qquad \text{Eq. 11}$$

where P is the total number of layers. The test function may then be compared against a threshold $\lambda$ and be expressed as in Equation 12 below:

$$t = f(Y_l) = \begin{cases} 1, & T(Y_l) \geq \lambda, \\ 0, & T(Y_l) < \lambda, \end{cases} \qquad \text{Eq. 12}$$

The $P_f$ and $P_{md}$ for this test may be quantified by varying $\lambda$. Regarding NN-training, objective function such as the empirical cross entropy (CE) between the NN output and the labels via gradient descent algorithm to minimize the CE may be undertaken.

At representation 1108, training or construction of a model (e.g., classifier or ML) is complete, and deployment or inference of a potential malicious transmission signal may occur. Once the association (in N—P based approach) or training (in ML-based approach) phase is completed, the model may classify the actively received signal from potential malicious user signal subject to the test established during training. A malicious user signal may be called a Signal Under Test (SUT). In an example, when a potentially malicious user is actively transmitting, its signal at the receiving infrastructure when fed to the established LLR-based test or the trained NN, may be used to infer its bin ID via running the test. From the associated bin ID, the malicious signal's bin or region of operation may easily be deduced given the reference map (based on trained NN model established in from prior and periodically evolved training). This step is same for N-P and NN-based approaches (both).

Figure 12:
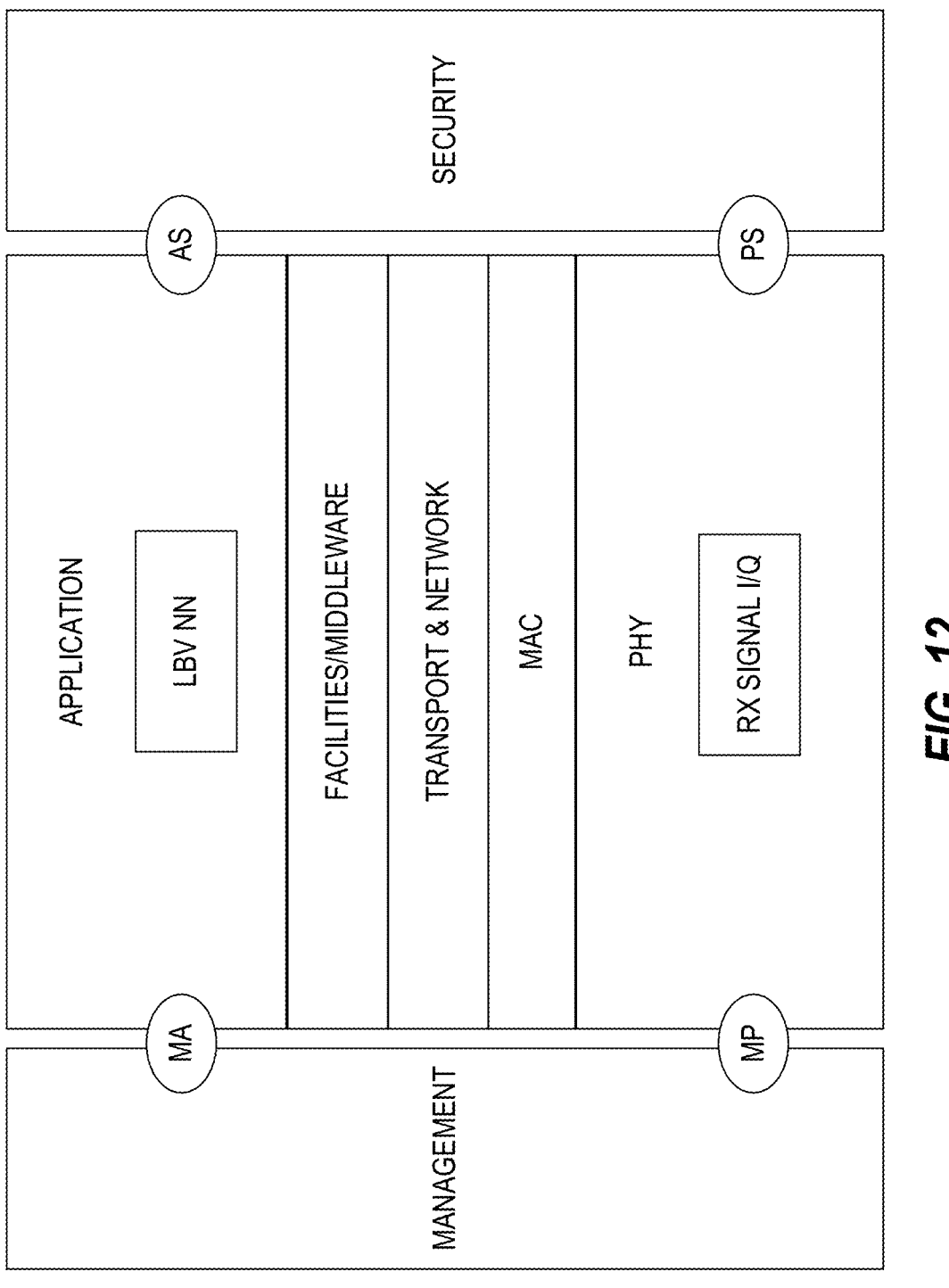
FIG. 12 illustrates an example of cross-layer placement of a location-based bin-region verification neural network according to an example.

FIG. 12 illustrates an example of cross-layer placement of a location-based bin-region verification neural network according to an example. The cross-layer framework of FIG. 12 allows for collaboration across infrastructures, including identifying locations of malicious devices or users with collaborative location identification with two or more layers or with two or more edge infrastructure devices.

A cross-layer (e.g., Physical layer to Application, full-stack) framework with location-based Fingerprinting (LFP) may be used for addressing user authentication or misbehavior detection. The authentication or detection may be based on a radio map environment extraction at the AP/BS/RSU. A low-dimensional bin map (e.g., from access layer based on I/Q samples processing) may be combined with higher layer context information, such as geo, other trust parameters from the Security plane, application class, application type, application requirement, or application need, such as from APP layer, or the like. The context information may be used to enhance resiliency of the network via precise identification of the malicious users (e.g., a jammer or attacker).

In an example, an access-layer based technique of LBV may be combined with higher layer (facility or middleware) techniques to enhance reliability of misbehavior detection. In 5G/B5G ITS Vertical, the facility layer has collective perception services (CPS) where UEs (Vehicles, RSU) periodically share their local or on-board perception as a list of detected objects and their attributes (e.g., location, dimension, speed, acceleration, direction, etc. of objects) among proximate UEs. When a PMU (e.g., jammer or attacker) has been identified and its region of operation has been localized by the proposed LBV, CPS may be used to cross-check presence of the malicious user in the identified bin or region. Collective perception message (CPM) from trusted UEs currently located in the proximity of malicious user may report the malicious user as one of the detected objects at the location identified by location-based Fingerprinting. In some examples, the proposed LBV may be improved by utilizing the CPS messages received by the RSU/BS/AP from trusted UEs currently located in the proximity of the malicious user. These trusted UEs may report exact sensor-detected coordinates of the malicious user in a bin-region in their object-list of the CPM. In another example, a malicious user may be reporting false location in its CPM to confuse other proximate UEs. These proximate UE's may have on-board sensors that do not detect any object at the location claimed by the malicious UE. Proximity UEs may know that the malicious UE is in a given Geo-area (e.g., based on communication range of radio access technology), however, identifying the exact location of the misbehaving user may be challenging at the facility layer. The facility layer may interface with the LBV component (e.g., via standard interfaces) to identify the exact location of the misbehaving user in this example.

Collaboration across infrastructure entities may be used for increased resilience. In this example, more than one edge infrastructure may be involved for increased robustness in identifying or verifying the active region where the malicious user may be present. The collaboration among multiple edge infrastructure may be beneficial in many cases, such as when a malicious user is subscribed to one edge infrastructure but is trying to attack another edge infrastructure and moving to keep switching between the subscriptions or when a malicious user is at the borderline or overlapping bin-region covered by two or more edge infrastructures. In such cases, a collaborative cross-edge infrastructure bin-region identification or verification technique may be used for increasing the confidence of the bin-region classification (by lowering $P_f$, $P_{md}$, $P_e$). In this example, one or more of the following information may be exchanged from one edge infrastructure to another, trained bin-map, LLR test statistics and thresholds, SoftMax layer or deeper layers (weights and biases therein) of the NN in case principles of transfer learning are to be applied, last inferred bin-ID of the malicious user along with the raw measurements (e.g., location of trusted (already authenticated) crowdsources, RSRP/RSRQ/RSSI, I/Q samples, time-stamp), or the like.

For a cooperative cross-verification for increased confidence (lowering $P_f$, $P_{md}$, $P_e$), majority (e.g., K out of N) or other voting rules (e.g., weighted according to proximity) may be used to combine the bin-maps. LLRs, or raw measurements observations at various edge infrastructures. The edge infrastructure subject to the malicious user, which may be called an "ego edge infrastructure" may take help of the nearby edge infrastructures (when available) to robustly decide on the bin-location of the malicious user. Regarding the transfer learning case, the ego edge infrastructure can send its SoftMax layer or deeper layers (weights and biases therein) of NN to a destination edge infrastructure (who may request it when the destination edge infrastructure is the "ego edge infrastructure" in question), or augment or enhance its own SoftMax layer or deeper layers (weights and biases therein) of NN to make a more resilient decision (with lower $P_f$ $P_{md}$, $P_e$), on the presence/absence of the malicious user SUT within the bin-ID of interest.

Figure 13:
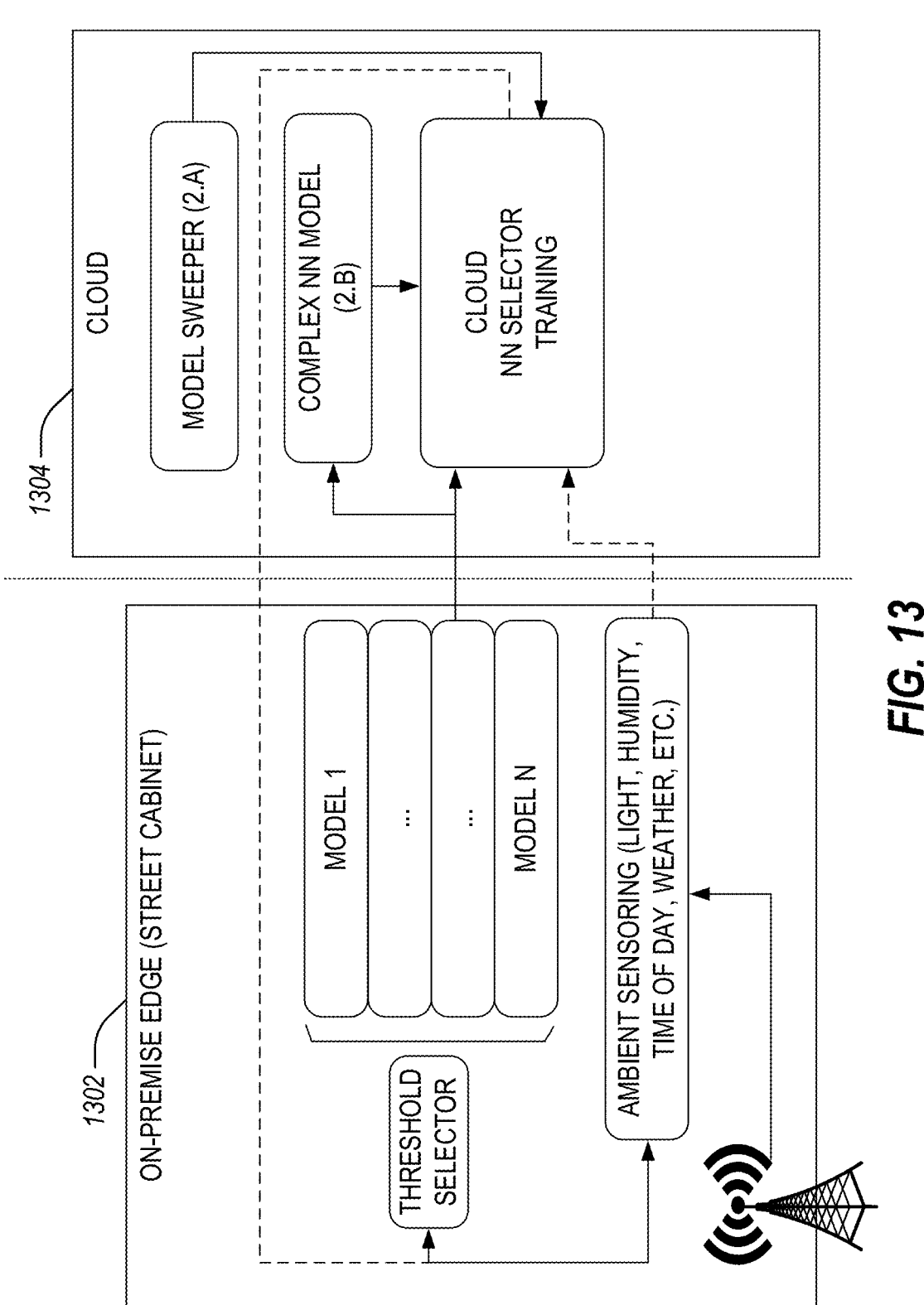
FIG. 13 illustrates infrastructure showing dynamicity of an edge device that updates over time according to an example.

FIG. 13 illustrates infrastructure showing dynamicity of an edge device that updates over time according to an example. FIG. 13 illustrates an edge device 1302 (e.g., an on-premise edge device, such as a street cabinet, a base station, etc.) in communication with the a cloud 1304.

As discussed above, one important aspect of edge is the dynamicity of all the various elements that may surround an edge appliance. For example, many attributes of an edge infrastructure may change over time, such as ambient and contextual information (e.g., temperature, humidity, wind, etc.) or physical properties of an area of the edge. The ambient and contextual information elements may affect how waves traverse the air, and potentially change how the wireless signals or channel behave. Similarly, the landscape of a particular appliance may change, causing changes in signals or channels. For example, a new scaffolding may be added in a building where a base station located. These changes may cause changes on how wireless signals from peers is perceived.

In some examples, using the techniques and systems described herein, a potentially malicious device may appear that is not actually malicious, but is identified as such based on system changes at the edge. A model that identifies potential wireless signal behaviors may not actually identify misbehaviors, and instead may incorrectly label changes caused by normal environmental differences as malicious. In order to prevent this misidentification and determine whether activity is malicious or benign, contextual information may be used.

The edge device 1302, such as a base station or cabinet, may collect contextual information that is stored along with the identified misbehaving UEs when these occur. Types of contextual data may include sensor data that captures ambient properties, or camera data that may be used to identify physical changes. The base station may stream detected potential anomalies and contextual data to the cloud 1304 or a data center edge. The cloud 1304 or data center edge may crowdsource with other base stations or with more complex analysis (or event with more detailed information provided post-mortem) as to whether the identified anomaly was really an anomaly or not.

The cloud 1304 or data center edge may derivate a model to identify potential false positives that may be triggered by the models and propose the right models (e.g., ones that can be trained based for different contextual situations). This meta-selector model (also called a threshold selector) may be responsible to select the right model or models for anomaly detection that behave best for current ambient or environmental parameters. A NN may be used to dynamically select models (e.g., based on thresholding) based on identification of extent or level of false positives triggered by the currently used NN model. In an example, this learning to create the selector in may leverage federated learning among multiple data center edges to increase the accuracy and spectrum of data sets.

Figure 14:
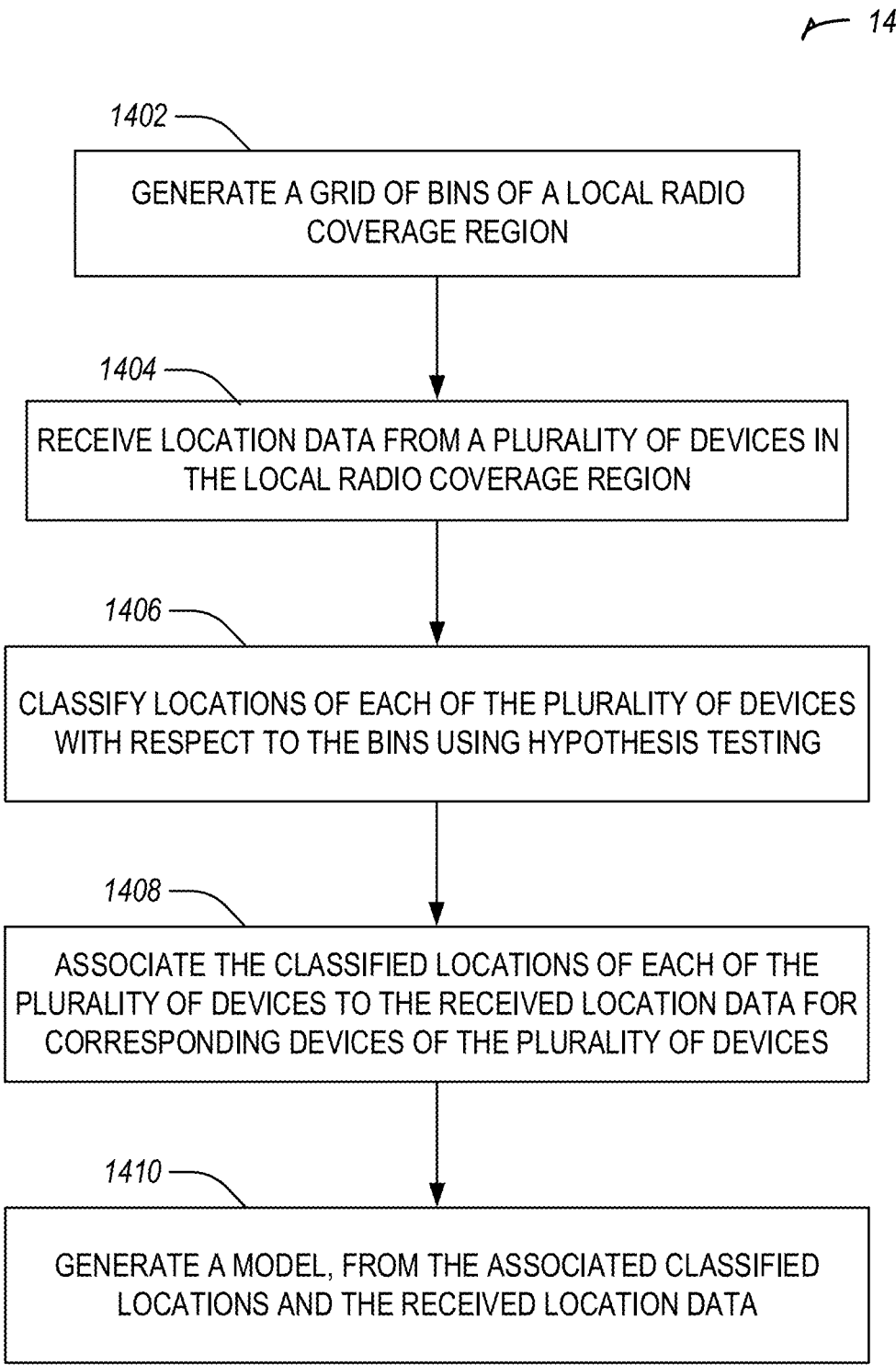
FIG. 14 illustrates a flowchart showing a technique for region identification of a malicious device based on crowd-sourced locations according to an example.

FIG. 14 illustrates a flowchart showing a technique 1400 for region identification of a malicious device based on crowdsourced locations according to an example. The technique 1400 may be performed by an edge device in an edge network (e.g., in communication with one or more IoT devices), such as a base station, a server, a mobile device, an IoT device, or the like.

The technique 1400 includes an operation 1402 to generate a grid of bins of a local radio coverage region. In an example, each bin the grid of bins has a particular size, such as one square meter (one meter by one meter), four square meters, etc. When resources provide an opportunity for smaller bins (e.g., an edge device with sufficient resources at a given time), the bin size may be smaller than one square meter. In an example, each bin in the grid of bins has a respective unique bin identifier. A model may to output a unique bin identifier corresponding to a received signal in this example. The grid of bins may be a two-dimensional grid (e.g., even though signals may be received with three-dimensional coordinates or information).

The technique 1400 includes an operation 1404 to receive location data from a plurality of devices in the local radio coverage region. In an example, the plurality of devices may be trusted or known to the edge device. For example, the plurality of devices may be pre-authenticated, within a particular network, verifiable by the edge device, or the like.

The technique 1400 includes an operation 1406 to classify locations of each of the plurality of devices with respect to the bins using hypothesis testing. Operation 1406 may occur passively, such as by periodically receiving location data when convenient (e.g., when resources allow, such as when power is available, the network is not busy, interference is low, etc.). In another example, operation 1406 may occur actively, such as by pinging or querying connected devices. In the active example, operation 1406 may be triggered on-demand, such as based on a request (e.g., when an unknown or potentially malicious device is identified or is nearby, from suspicious or elevated network traffic, etc.). In some examples, the location data includes reported cartesian (e.g., X, Y) coordinates of a device of the plurality of devices. In some examples, the location data includes a timestamp of sent data, a received signal strength indicator (RSSI), a Reference Signal Received Power (RSRP), a Reference Signal Received Quality (RSRQ), a Power Headroom Report (PHR), an interference level of a respective device of the plurality of devices, or the like. Hypothesis testing may include testing what bin a location is in using a M-ary test where N corresponds to a number of bins in the grid of bins. In another example, hypothesis testing may include testing whether a location is in a particular bin using a binary test corresponding to the particular bin.

The technique 1400 includes an operation 1408 to associate the classified locations of each of the plurality of devices to the received location data for corresponding devices of the plurality of devices. In an example, operation 1408 may include associated classified locations with any of the location data described above in operation 1406. Operation 1408 may include using a trained neural network to map multipath channel gains with the bins of the grid of bins.

The technique 1400 includes an operation 1410 to generate a model, from the associated classified locations and the received location data. The model may include a stochastic mapping of channel statistics to bins. In another example, the model is a neural network. The neural network may be updated based on neural network information received from a second edge device corresponding to a second grid generated at the second edge device in some examples.

In an example, the technique 1400 may include on operation to output the model for bin location identification of a received signal. The technique 1400 may include using the model to determine the bin location of the received signal, wherein the received signal is a potentially malicious signal.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

Each of these non-limiting examples may stand on its own, or may be combined in various permutations or combinations with one or more of the other examples.

Example 1 is an edge device for region identification of a malicious device based on crowdsourced locations, the edge device comprising: processing circuitry; and memory including instructions, which when executed by the processing circuitry, cause the processing circuitry to perform operations including: generating a grid of bins of a local radio coverage region; receiving location data from a plurality of devices in the local radio coverage region; classifying locations of each of the plurality of devices with respect to the bins using hypothesis testing; associating the classified locations of each of the plurality of devices to the received location data for corresponding devices of the plurality of devices; generating a model, from the associated classified locations and the received location data; outputting the model for bin location identification of a received signal.

In Example 2, the subject matter of Example 1 includes, wherein each bin in the grid of bins is one square meter in size.

In Example 3, the subject matter of Examples 1-2 includes, wherein each bin in the grid of bins has a respective unique bin identifier, and wherein the model is to output a unique bin identifier corresponding to the received signal.

In Example 4, the subject matter of Examples 1-3 includes, wherein the grid of bins is a two-dimensional grid.

In Example 5, the subject matter of Examples 1-4 includes, wherein the plurality of devices are devices that are trusted or known to the edge device.

In Example 6, the subject matter of Examples 1-5 includes, wherein receiving the location data includes passively and periodically receiving the location data.

In Example 7, the subject matter of Examples 1-6 includes, wherein receiving the location data includes actively receiving the location data on-demand based on a request.

In Example 8, the subject matter of Examples 1-7 includes, wherein the location data includes reported cartesian coordinates of a respective device of the plurality of devices.

In Example 9, the subject matter of Examples 1-8 includes, wherein the location data includes at least one of a timestamp of sent data, a received signal strength indicator (RSSI), a Reference Signal Received Power (RSRP), a Reference Signal Received Quality (RSRQ), a Power Headroom Report (PHR), or an interference level of a respective device of the plurality of devices.

In Example 10, the subject matter of Example 9 includes, wherein associating the classified locations includes associating the classified locations with a RSSI, RSRQ, or RSRP received from each device.

In Example 11, the subject matter of Examples 1-10 includes, wherein the hypothesis testing includes testing what bin a location is in using a M-ary test where N corresponds to a number of bins in the grid of bins.

In Example 12, the subject matter of Examples 1-11 includes, wherein the hypothesis testing includes testing whether a location is in a particular bin using a binary test corresponding to the particular bin.

In Example 13, the subject matter of Examples 1-12 includes, wherein associating the classified locations includes using a trained neural network to map multipath channel gains with the bins of the grid of bins.

In Example 14, the subject matter of Examples 1-13 includes, wherein the model includes a stochastic mapping of channel statistics to bins.

In Example 15, the subject matter of Examples 1-14 includes, wherein the model is a neural network.

In Example 16, the subject matter of Example 15 includes, operations including updating the neural network based on neural network information received from a second edge device corresponding to a second grid generated at the second edge device.

In Example 17, the subject matter of Examples 1-16 includes, operations including using the model to determine the bin location of the received signal, wherein the received signal is a potentially malicious signal.

Example 18 is an apparatus for region identification of a malicious device based on crowdsourced locations, the apparatus comprising: means for generating a grid of bins of a local radio coverage region; means for receiving location data from a plurality of devices in the local radio coverage region; means for classifying locations of each of the plurality of devices with respect to the bins using hypothesis testing; means for associating the classified locations of each of the plurality of devices to the received location data for corresponding devices of the plurality of devices; means for generating a model, from the associated classified locations and the received location data; means for outputting the model for bin location identification of a received signal.

In Example 19, the subject matter of Example 18 includes, wherein the plurality of devices are devices that are trusted or known to the edge device.

In Example 20, the subject matter of Examples 18-19 includes, wherein the location data includes at least one of a timestamp of sent data, a received signal strength indicator (RSSI), a Reference Signal Received Power (RSRP), a Reference Signal Received Quality (RSRQ), a Power Headroom Report (PHR), or an interference level of a respective device of the plurality of devices.

In Example 21, the subject matter of Example 20 includes, wherein the means for associating the classified locations include means for associating the classified locations with a RSSI, RSRQ, or RSRP received from each device.

Example 22 is a method for region identification of a malicious device based on crowdsourced locations, the method comprising: generating a grid of bins of a local radio coverage region; receiving location data from a plurality of devices in the local radio coverage region; classifying locations of each of the plurality of devices with respect to the bins using hypothesis testing; associating the classified locations of each of the plurality of devices to the received location data for corresponding devices of the plurality of devices; generating a model, from the associated classified locations and the received location data; outputting the model for bin location identification of a received signal.

In Example 23, the subject matter of Examples 1-22 includes, wherein the model is a neural network, and further comprising updating the neural network based on neural network information received from a second edge device corresponding to a second grid generated at the second edge device.

Example 24 is at least one machine-readable medium including instructions for region identification of a malicious device based on crowdsourced locations, which when executed by processing circuitry, cause the processing circuitry to perform operations comprising: generating a grid of bins of a local radio coverage region; receiving location data from a plurality of devices in the local radio coverage region; classifying locations of each of the plurality of devices with respect to the bins using hypothesis testing; associating the classified locations of each of the plurality of devices to the received location data for corresponding devices of the plurality of devices; generating a model, from the associated classified locations and the received location data; outputting the model for bin location identification of a received signal.

In Example 25, the subject matter of Examples 1-24 includes, operations including using the model to determine the bin location of the received signal, wherein the received signal is a potentially malicious signal.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Another example implementation is an edge computing system, including respective edge processing devices and nodes to invoke or perform the operations of Examples 1-25, or other subject matter described herein.

Another example implementation is a client endpoint node, operable to invoke or perform the operations of Examples 1-25, or other subject matter described herein.

Another example implementation is an aggregation node, network hub node, gateway node, or core data processing node, within or coupled to an edge computing system, operable to invoke or perform the operations of Examples 1-25, or other subject matter described herein.

Another example implementation is an access point, base station, road-side unit, street-side unit, or on-premise unit, within or coupled to an edge computing system, operable to invoke or perform the operations of Examples 1-25, or other subject matter described herein.

Another example implementation is an edge provisioning node, service orchestration node, application orchestration node, or multi-tenant management node, within or coupled to an edge computing system, operable to invoke or perform the operations of Examples 1-25, or other subject matter described herein.

Another example implementation is an edge node operating an edge provisioning service, application or service orchestration service, virtual machine deployment, container deployment, function deployment, and compute management, within or coupled to an edge computing system, operable to invoke or perform the operations of Examples 1-25, or other subject matter described herein.

Another example implementation is an edge computing system including aspects of network functions, acceleration functions, acceleration hardware, storage hardware, or computation hardware resources, operable to invoke or perform the use cases discussed herein, with use of Examples 1-25, or other subject matter described herein.

Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of Examples 1-25, or other subject matter described herein.

Another example implementation is an edge computing system adapted for mobile wireless communications, including configurations according to an 3GPP 4G/LTE or 5G network capabilities, operable to invoke or perform the use cases discussed herein, with use of Examples 1-25, or other subject matter described herein.

Another example implementation is an edge computing node, operable in a layer of an edge computing network or edge computing system as an aggregation node, network hub node, gateway node, or core data processing node, operable in a close edge, local edge, enterprise edge, on-premise edge, near edge, middle, edge, or far edge network layer, or operable in a set of nodes having common latency, timing, or distance characteristics, operable to invoke or perform the use cases discussed herein, with use of Examples 1-25, or other subject matter described herein.

Another example implementation is networking hardware, acceleration hardware, storage hardware, or computation hardware, with capabilities implemented thereupon, operable in an edge computing system to invoke or perform the use cases discussed herein, with use of Examples 1-25, or other subject matter described herein.

Another example implementation is an edge computing system configured to perform use cases provided from one or more of: compute offload, data caching, video processing, network function virtualization, radio access network management, augmented reality, virtual reality, industrial automation, retail services, manufacturing operations, smart buildings, energy management, autonomous driving, vehicle assistance, vehicle communications, internet of things operations, object detection, speech recognition, healthcare applications, gaming applications, or accelerated content processing, with use of Examples 1-25, or other subject matter described herein.

Another example implementation is an apparatus of an edge computing system comprising: one or more processors and one or more computer-readable media comprising instructions that, when executed by the one or more processors, cause the one or more processors to invoke or perform the use cases discussed herein, with use of Examples 1-25 or other subject matter described herein.

Another example implementation is one or more computer-readable storage media comprising instructions to cause an electronic device of an edge computing system, upon execution of the instructions by one or more processors of the electronic device, to invoke or perform the use cases discussed herein, with use of Examples 1-25, or other subject matter described herein.

Another example implementation is an apparatus of an edge computing system comprising means, logic, modules, or circuitry to invoke or perform the use cases discussed herein, with use of Examples 1-25, or other subject matter described herein.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. An edge device for region identification of a malicious device based on crowdsourced locations, the edge device comprising:
  processing circuitry; and
  memory including instructions, which when executed by the processing circuitry, cause the processing circuitry to perform operations including:
    receiving location data from a plurality of devices in a local radio coverage region;
    classifying locations of each of the plurality of devices;
    associating the classified locations of each of the plurality of devices to the received location data for corresponding devices of the plurality of devices;
    generating a model, from the associated classified locations and the received location data;
    receiving, from a device, a received signal including a reported location of the device;
    determining an actual location of the device using the model, wherein the model is a neural network;
    updating the neural network based on neural network information received from a second edge device corresponding to a second device location generated at the second edge device; and
    outputting, from the model, an indication that the device is malicious based on a mismatch between the reported location and the actual location.

2. The edge device of claim 1, wherein the local radio coverage region includes a grid of bins and each bin in the grid of bins is one square meter in size.

3. The edge device of claim 1, wherein the local radio coverage region includes a grid of bins and each bin in the grid of bins has a respective unique bin identifier, and wherein the model is to output a unique bin identifier corresponding to the received signal.

4. The edge device of claim 1, wherein the local radio coverage region includes a two-dimensional grid of bins.

5. The edge device of claim 1, wherein the plurality of devices are devices that are trusted or known to the edge device.

6. The edge device of claim 1, wherein receiving the location data includes passively and periodically receiving the location data.

7. The edge device of claim 1, wherein receiving the location data includes actively receiving the location data on-demand based on a request.

8. The edge device of claim 1, wherein the location data includes reported cartesian coordinates of a respective device of the plurality of devices.

9. The edge device of claim 1, wherein the location data includes at least one of a timestamp of sent data, a received signal strength indicator (RSSI), a Reference Signal Received Power (RSRP), a Reference Signal Received Quality (RSRQ), a Power Headroom Report (PHR), or an interference level of a respective device of the plurality of devices.

10. The edge device of claim 9, wherein associating the classified locations includes associating the classified locations with a RSSI, RSRQ, or RSRP received from each device.

11. The edge device of claim 1, wherein classifying locations of each of the plurality of devices includes using hypothesis testing including testing what bin of a grid of bins a location is in using a M-ary test where a value of M in the M-ary test corresponds to a number of bins in a column of the grid of bins.

12. The edge device of claim 1, wherein the local radio coverage region includes a grid of bins and wherein associating the classified locations includes using a trained neural network to map multipath channel gains with bins of the grid of bins.

13. The edge device of claim 1, wherein the model includes a stochastic mapping of channel statistics to bins.

14. The edge device of claim 1, further comprising operations including using the model to determine bin location, in a grid of bins, of the received signal, wherein the received signal is a potentially malicious signal.

15. An apparatus for region identification of a malicious device based on crowdsourced locations, the apparatus comprising:
  means for receiving location data from a plurality of devices in a local radio coverage region;
  means for classifying locations of each of the plurality of devices;
  means for associating the classified locations of each of the plurality of devices to the received location data for corresponding devices of the plurality of devices;
  means for generating a model, from the associated classified locations and the received location data; and
  means for receiving, from a device, a received signal including a reported location of the device;
  means for determining an actual location of the device using the model, wherein the model is a neural network;
  means for updating the neural network based on neural network information received from a second edge device corresponding to a second device location generated at the second edge device; and
  means for outputting, from the model, an indication that the device is malicious based on a mismatch between the reported location and the actual location.

16. The apparatus of claim 15, wherein the plurality of devices are devices that are trusted or known to the apparatus.

17. The apparatus of claim 15, wherein the location data includes at least one of a timestamp of sent data, a received signal strength indicator (RSSI), a Reference Signal Received Power (RSRP), a Reference Signal Received Quality (RSRQ), a Power Headroom Report (PHR), or an interference level of a respective device of the plurality of devices.

18. The apparatus of claim 17, wherein the means for associating the classified locations include means for associating the classified locations with a RSSI, RSRQ, or RSRP received from each device.

19. A method for region identification of a malicious device based on crowdsourced locations, the method comprising:

receiving, at an edge device, location data from a plurality of devices in a local radio coverage region;

classifying locations of each of the plurality of devices;

associating the classified locations of each of the plurality of devices to the received location data for corresponding devices of the plurality of devices;

generating a model for the edge device from the associated classified locations and the received location data; and receiving, from a device, a received signal including a reported location of the device;

determining an actual location of the device using the model, wherein the model is a neural network;

updating the neural network based on neural network information received from a second edge device corresponding to a second device location generated at the second edge device; and outputting, from the model, an indication that the device is malicious based on a mismatch between the reported location and the actual location.

20. At least one non-transitory machine-readable medium including instructions for region identification of a malicious device based on crowdsourced locations, which when executed by processing circuitry, cause the processing circuitry to perform operations comprising:

receiving location data from a plurality of devices in a local radio coverage region;

classifying locations of each of the plurality of devices;

associating the classified locations of each of the plurality of devices to the received location data for corresponding devices of the plurality of devices;

generating a model, from the associated classified locations and the received location data; and receiving, from a device, a received signal including a reported location of the device;

determining an actual location of the device using the model, wherein the model is a neural network;

updating the neural network based on neural network information received from a second edge device corresponding to a second device location generated at the second edge device; and outputting, from the model, an indication that the device is malicious based on a mismatch between the reported location and the actual location.

* * * * *